March 15, 1960

H. E. STOKEY 2,928,320

HOLD DOWN CLAMP

Filed Aug. 12, 1958

INVENTOR
*Harold E. Stokey*

BY *Frease & Bishop*

ATTORNEYS

March 15, 1960 — H. E. STOKEY — 2,928,320
HOLD DOWN CLAMP
Filed Aug. 12, 1958 — 2 Sheets-Sheet 2

INVENTOR
Harold E. Stokey
BY Frease & Bishop
ATTORNEYS

United States Patent Office 2,928,320
Patented Mar. 15, 1960

2,928,320
HOLD DOWN CLAMP

Harold E. Stokey, New Philadelphia, Ohio, assignor to Allied Machine & Engineering Corp., New Philadelphia, Ohio, a corporation of Ohio Application August 12, 1958, Serial No. 754,574

2 Claims. (Cl. 90—59)

This invention pertains to improvements in holding and clamping devices for workpieces on the bed of a machine tool.

Various devices have been proposed from time to time for holding a workpiece on a machine tool. The advantage of such devices usually is their simplicity of construction which facilitates setting up and maintaining a workpiece in the desired position on the bed of a machine tool. Many of such devices, however, do not actually provide steady support for the workpiece.

It has been found that the holding or clamping device which provides a vertical line of support perpendicular to the bed of the machine tool is the most desirable type of support. It provides the steadiest means for maintaining the workpiece and is not susceptible to being dislocated such as by vibrations created during the subsequent working operations on the workpiece.

Associated with the foregoing considerations is a problem of providing steady support that is usable in varying lengths depending upon the size of the workpiece. For example, various members of a clamp should be detachably secured together in different lengths such as in multiples of two or four inches to accommodate various sized workpieces.

Accordingly, it is a general object of this invention to provide a hold down clamp which maintains a vertical line of support preferably perpendicular to the bed of the workpiece.

It is another object of this invention to provide a hold down clamp for placing and maintaining a workpiece on the bed of the machine tool in a steady immovable manner.

Finally, it is another object of this invention to provide a hold down clamp for a workpiece which accomplishes the foregoing objects and desiderata in a simple, effective, and inexpensive manner.

These and other objects and advantages apparent to those skilled in the art from the following description and claims may be obtained, the stated results achieved, and the described difficulties overcome by the discoveries, principles, apparatus, parts, elements and combinations and subcombinations which comprise the present invention, the nature of which is set forth in the following general statement, a preferred embodiment of which—illustrative of the best mode in which applicant has contemplated applying the principles—is set forth in the following description and shown in the drawing, and which is particularly and distinctly pointed out and set forth in the appended claims forming part hereof.

The improved hold clamp construction of the present invention may be stated in general terms as including a base, an elongated tube, a thrust element, a strap, and a tie rod; the base having a flat side for placement on the bed of a machine tool, the base also having a threaded stem, the tube having threaded end portions one of which threaded end portions is engageable with the threaded stem of the base, the thrust element including a ball and socket joint with remote threaded end portions one of which is engageable with the other threaded end portion of the tube, the strap having a threaded aperture engageable with the other threaded end portion of the thrust element, the strap also having a notch or opening for receiving one end of the tie rod, the tie rod having a tightening nut whereby one end of the rod may be secured in a T-slot in the bed of the machine tool and, with the strap extending from the upper end of the upright clamp to an adjacent surface on the workpiece, the tie rod may be tightened in place so as to clamp the workpiece in place on the bed of the machine tool.

By way of example, a preferred embodiment of the invention is illustrated in the accompanying drawings, in which.

Similar numerals refer to similar parts throughout the various figures of the drawings.

Figures 1, 2, 3, 4:
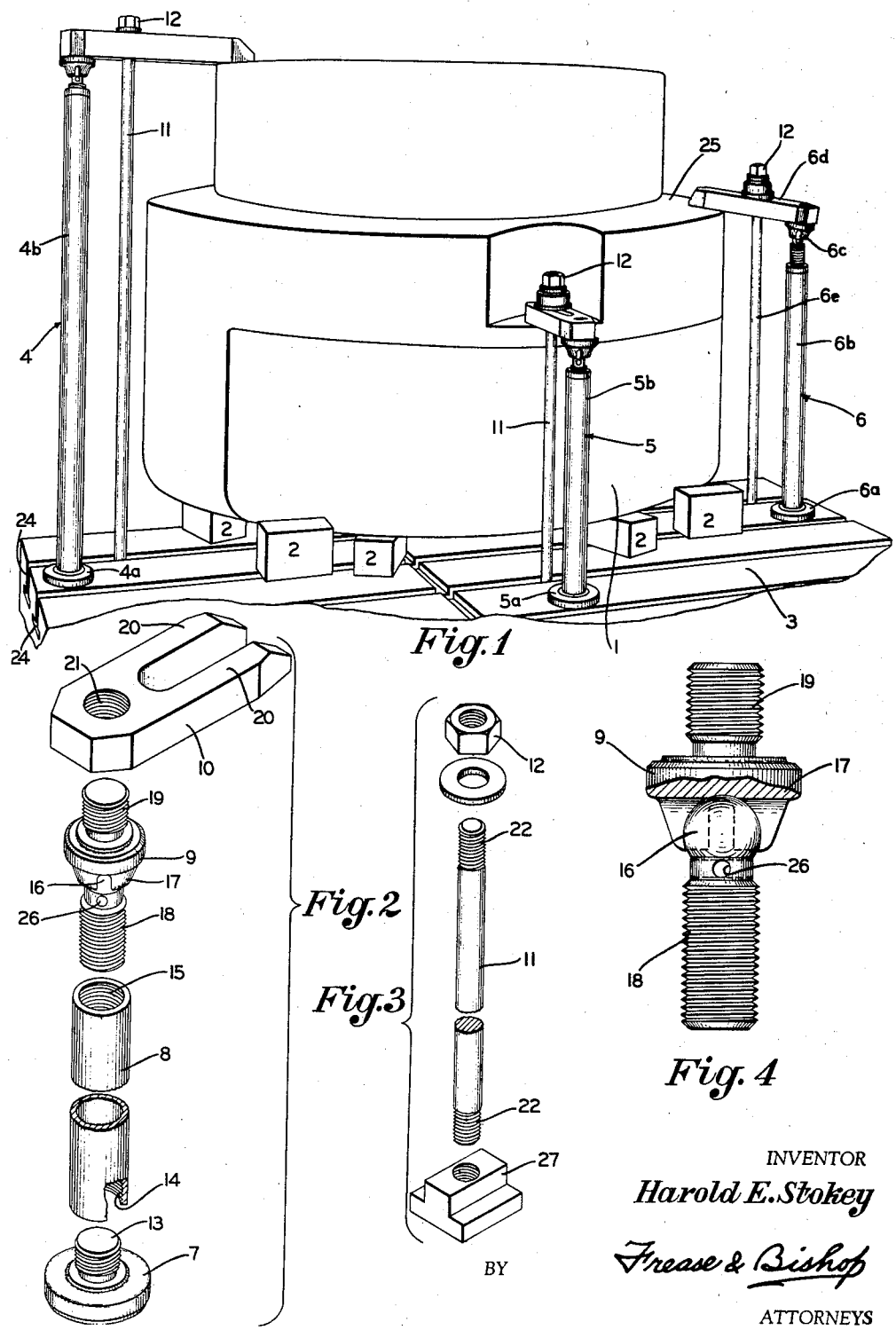
Figure 1 is a perspective view showing three hold down clamps holding a workpiece on a bed of a machine tool.
Fig. 2 is an exploded view of the various members comprising the hold down clamp.
Fig. 3 is an exploded view of the tie rod used with the clamp.
Fig. 4 is an elevational view, partly in section, of the ball and socket member of the clamp.

In Fig. 1 a workpiece 1 is mounted on spaced blocks 2 on a bed 3 of a milling machine. The workpiece 1 is supported and maintained in a fixed position on the bed 3 by a number of hold down clamps generally indicated at 4, 5, and 6.

As shown in Fig. 2, each clamp includes a base 7, an elongated member or tube 8, a ball and socket joint 9, and a strap 10. In addition, the clamp includes a tie rod 11 (Fig. 3) having a detachable nut 12 preferably at each end.

The base 7 includes a flat undersurface and an integral threaded stem 13. The tube 8 includes a lower internal threaded portion 14 engageable with the threaded stem 13 of the base 7. Likewise, the upper end of the tube has a threaded internal portion 15.

The joint 9, more clearly shown in Fig. 4, includes a lower ball member 16 and an upper ball-receiving cup or socket member 17. In addition, the ball member 16 includes an elongated threaded stem 18 and the socket member 17 includes a threaded stem 19.

The strap 10 is a bifurcated member having furcations 20. Also, it is provided with a threaded aperture 21.

As shown in Fig. 3, the tie rod 11 includes at least one threaded end portion 22 which is engaged by the nut 12. Similarly, the opposite end of the rod 11 may be threaded like the threaded end portion 22 for use with a T-shaped nut 27 which is slidable in various conventional T-shaped slots 24 in the surface of the bed 3 of the milling machine.

All of the parts shown in Fig. 2, including the base 7, the tube 8, the ball and socket joint 9, and the strap 10, are secured together by their interfitting threaded portions. Thus, the threaded stem 13 of the base engages the internally threaded portion 14 of the tube 8. Likewise, the threaded stem 18 of the ball and socket joint 9 engages the internally threaded portion 15 of the tube. Again, the threaded stem 19 of the ball and socket joint 9 engages the threaded aperture 21 of the strap 10.

The upper end of the tie rod 11 is disposed in the slot between the furcations 20 of the strap when assembled for use as shown in Fig. 1.

In operation, when the workpiece 1 is mounted on the bed 3, the clamps 4, 5, and 6 are used at convenient locations so as to not interfere with the operation of the particular machine tool of which the bed 3 is a part. For most convenience, the tubes 8 are preferably provided in varying lengths of four inch increments. The lengths between may be obtained by varying the distances by which the threaded stems 13 and 18 are turned into their respective tube end portions. The clamps 4, 5, and 6 are placed upright in a vertical position upon the horizontal bed 3 with the particular bases 4a, 5a, and 6a in contact with the surface of the bed 3. The corresponding elongated tubes 4b, 5b, and 6b extend vertically to a location substantially near the vertical position of the surface on which the strap is placed.

Though it is preferred that the strap extend horizontally between the engaged surfaces of the workpiece 1 and the top of the clamp 4, 5, or 6, it is not always possible. Therefore, the ball and socket joint 9 is useful for making slight adjustments. However, the location of the ball and socket joint at the top, rather than the bottom, of the clamp is necessary to maintain the clamp in the vertical position. Thus, whatever adjustments are necessary between the height of the surface engaged by the strap and the top of the clamp is made by the ball and socket joint 9. For this purpose also the stem portion 18 of the joint 9 is elongated so that it may be extended substantially above the top of the tube, as shown in Fig. 1 for clamp 6, where the particular ball and socket joint 6c is secured with most of its lower threaded stem portion outside of the upper threaded end of the tube 6b.

Where a surface such as a surface 25 is inclined, the strap 6d on the surface is also inclined at an angle of inclination corresponding to that of the surface. The advantage of placing the ball and socket joint 6c at the top of the clamp is to adjust the strap to the proper inclination by screwing the lower threaded portion of the joint to the proper height above the upper end of the tube 6b. Thereafter the tie rod 6e is placed in position between the T-slot 24 and the strap 6d and tightened in place by the nut 12. In this manner compression is applied to the workpiece 1 and each clamp, as shown in Fig. 1.

If, instead of placing the ball and socket joint 9 at the upper end of the tube, it were placed at the lower end, any adjustments for differences in over-all height of the clamp and the clamped surface of the workpiece would result in the tube being disposed at an angle to the vertical position. With the clamp out of vertical alignment, it is more susceptible to being knocked, jarred, or vibrated out of place, which event is not possible with the clamp in vertical position.

As shown in Fig. 4, the portion of the threaded stem of the ball and socket joint 9 is provided with an aperture 26 in which a lever may be inserted for rotation of the ball portion 16 with respect to the socket portion 17.

Figure 5:
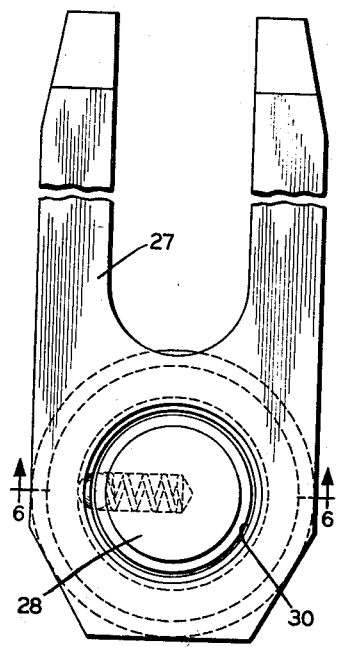
Fig. 5 is a plan view of another embodiment of a strap and ball and socket joint.
Figure 6:
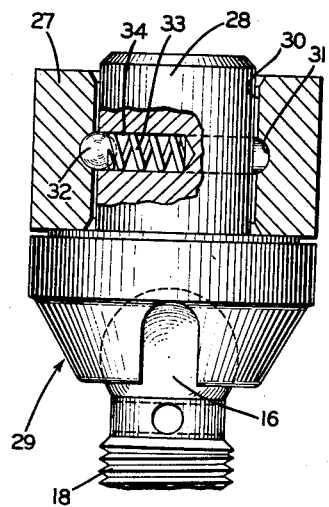
Fig. 6 is a vertical sectional view taken on the line 6—6 of Fig. 5.

Another embodiment of a strap 27 is shown in Figs. 5 and 6 mounted on a stem 28 of a ball and socket joint generally indicated at 29 (Fig. 6). The strap 27 includes an aperture 30 which is provided with an annular groove 31. The stem 28 of the ball and socket joint 29 is provided with a spring catch device which includes a ball 32 and a spring 33 disposed in a radially extending aperture 34 whereby the ball 32 engages the annular groove 31 so that the strap may be readily attached and detached from the stem 28.

Figure 7:
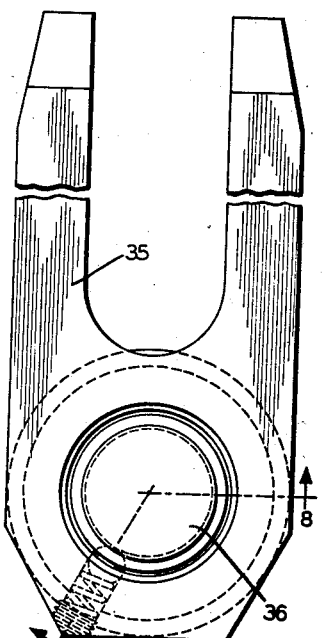
Fig. 7 is another embodiment of a strap and ball and socket joint.
Figure 8:
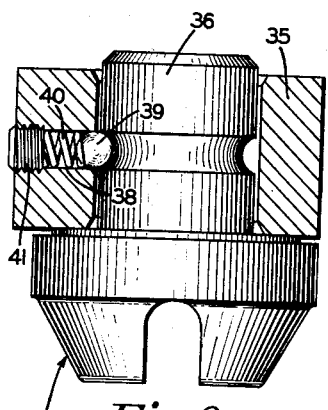
Fig. 8 is a vertical sectional view taken on the line 8—8 of Fig. 7.

Another embodiment of a strap 35 is shown in Figs. 7 and 8 in which the strap rather than a stem 36 of the ball and socket joint 37 is provided with a spring catch device. One member of the strap is apertured at 38 and a ball 39 and spring 40 are disposed within the aperture 38 where they are retained by a screw 41.

Figure 9:
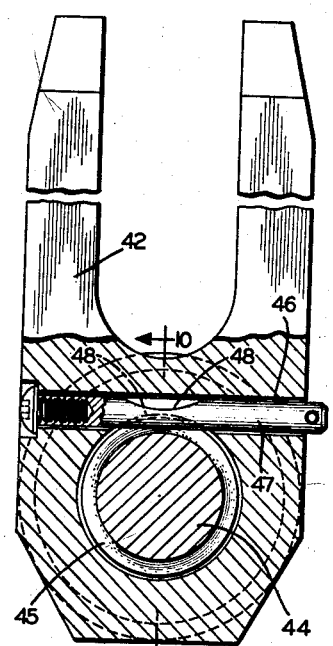
Fig. 9 is a plan view, partially in section, showing another embodiment of a strap and ball and socket joint.
Figure 10:
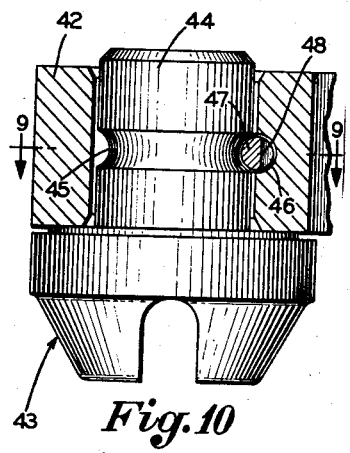
Fig. 10 is a vertical sectional view taken on the line 10—10 of Fig. 9.

Another embodiment of a strap 42 is shown in Figs. 9 and 10. A ball and socket joint 43 is provided with an upright stem 44 having an annular groove 45 therein similar to the stem 36 of Fig. 8. The strap 42 is provided with a transverse aperture 46 in which an elongated pin 47 is rotatably mounted. One side of the pin 47 adjacent the stem 44 includes a notch 48, the inner surface of which is arcuate with a radius substantially equal to the radius of the stem 44. When the pin 47 is in the position shown in Figs. 9 and 10, the pin engages the groove 45 of the stem 44 and prevents removal of the strap 42 from the stem. However, when the pin 47 is rotated 180° so that the notch 48 is adjacent the stem 44 (as shown by broken line 48) no portion of the pin occupies the groove 45 so that the strap 42 is readily detachable from the stem 44.

In the foregoing description, certain terms have been used for brevity, clearness and understanding; but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example and the scope of the present invention is not limited to the exact details illustrated, or to the specific mechanisms shown.

Having now described the features, discoveries and principles of the invention, the construction, operation, and use of the improved mechanisms and the advantageous, new, and useful results obtained thereby; the new and useful parts, elements, constructions, mechanisms, combinations, subcombinations, and arrangements, and mechanical equivalents obvious to those skilled in the art, are set forth in the appended claims.

I claim:

1. In a machinist's clamp for holding a workpiece on a machine tool bed having T-slots thereon wherein the clamp includes a base mountable on a machine tool bed, an elongated member extending upwardly from the base and spaced from a workpiece, a ball and socket joint adjustably mounted at the upper end of the elongated member, a bifurcated strap secured at one end of the ball and socket joint and extending to and in contact with the surface of the workpiece, and a tie rod extending between the strap and T-slot; the improvement in which the ball and socket joint includes upper and lower threaded portions engageable with complementary threaded portions respectively on the strap and the elongated member.

2. The construction as set forth in claim 1 in which the threaded portions of the ball and socket joint are threaded stems and in which the complementary threaded portions of the strap and elongated member are internally threaded openings.

References Cited in the file of this patent

UNITED STATES PATENTS

| | | |
|---|---|---|
| 1,093,554 | Erman | Apr. 14, 1914 |
| 1,420,147 | Roberts | June 20, 1922 |
| 1,479,127 | Cadwallader | Jan. 1, 1924 |
| 1,689,022 | Graham | Oct. 23, 1928 |
| 2,325,387 | Fredrickson | July 27, 1943 |
| 2,339,897 | Wetzler | Jan. 25, 1944 |
| 2,349,087 | Fraser | May 16, 1944 |
| 2,487,022 | La Placa | Nov. 1, 1949 |